United States Patent [19]
Kukesh et al.

[11] Patent Number: 4,841,768
[45] Date of Patent: Jun. 27, 1989

[54] PLURAL COMPONENT TESTER

[75] Inventors: Timothy S. Kukesh, Indianapolis; Larry G. Huber, Elkart, both of Ind.

[73] Assignee: Glas-Craft, Inc., Indianapolis, Ind.

[21] Appl. No.: 185,536

[22] Filed: Apr. 25, 1988

[51] Int. Cl.[4] .......... G01M 19/00
[52] U.S. Cl. .......... 73/168
[58] Field of Search .......... 73/3, 168, 195–197, 73/426, 861.04, 861, 863.41, 863.51, 865.9; 239/74, 71; 222/23, 135, 136

[56] References Cited

U.S. PATENT DOCUMENTS

| | | | |
|---|---|---|---|
| 3,125,879 | 3/1964 | Porter, Jr. | 73/3 |
| 3,216,622 | 11/1965 | Drostholm | 73/3 |
| 3,459,049 | 8/1969 | Kamps | 73/865.9 |
| 3,939,688 | 2/1976 | Misch et al. | 73/168 |
| 4,723,437 | 2/1988 | McKenzie | 73/861 |

OTHER PUBLICATIONS

Glas–Craft, Inc., "Catalyst Percentage Test Kit", 1982 (2 pages).

*Primary Examiner*—Stewart J. Levy
*Assistant Examiner*—Robert R. Raevis
*Attorney, Agent, or Firm*—Willian Brinks Olds Hofer Gilson & Lione

[57] ABSTRACT

A plural component tester for measuring the ratio of plural components delivered from a spray device during plural component spraying. The components are introduced into the tester through an elastomeric seal which separately channels each component into individual hoses. Each component is then separately advanced by the hosing and delivered to separate graduated containers which collect each component separately for easy and convenient measuring.

18 Claims, 3 Drawing Sheets

PLURAL COMPONENT TESTER

BACKGROUND OF THE INVENTION

This invention relates to a tester useful in plural component manufacturing operations, such as those used in the fiberglass-manufacturing industry and, more specifically, in the "spray-up" procedure used in the production of fiberglass products. Such products include boats, shower stalls and bathtubs, gasoline and chemical storage tanks, recreational vehicles and many other products.

One conventional application method or "spray-up" method involves a spray device with generally two apertures: one being for the dispersing of resin, such as polyester resin, and the other for the dispersing of the catalyst component. Resin and a catalyst component are the basic components of fiberglass reinforced resin, referred to frequently as "FRP". The two components are delivered separately to the spray device, generally at different flow rates and pressures. The flow rates and pressures of the components are dependent on the particular resin/catalyst systems being used and their specifications. Generally, the flow rate of the catalyst in the spray-up procedure is very much less than the flow rate of the resin.

The object of the spray-up procedure is to ensure a structurally sound product by delivering an even layer or coat of uniformly catalyzed resin mixture over a mold forming such a product.

Another conventional plural component operation is the dispensing of urethane foam systems. In such systems a catalyst is mixed with a urethane resin to produce a foam which cures into an effective thermal insulating system. Such urethane foam systems also need uniformly catalyzed resin.

The operator of such plural component systems is frequently forced to speculate as to the ratio of catalyst-to-resin percentage that he is using. The operator may be able to reliably determine the pressure under which each component is being delivered to the spray device by individual pressure gauges for each component; however, he cannot determine the relative rate of flow of each component and the resulting component to component ratio. In the past, the operator was forced to measure the resin flow rate by stopping his operation and collecting resin from his device for a measured time. Upon the completion of the resin test, the operator had to repeat the measurement procedure for the catalyst and then calculate the flow rates of the resin and catalyst and their respective ratio.

SUMMARY OF THE INVENTION

This invention allows the person performing the spray-up procedure to measure simultaneously, accurately and quickly the ratio of plural components delivered from a device without significant interruptions of plural component spraying or dispensing. The invention permits an operator to measure accurately the catalyst-to-resin percentage.

A preferred embodiment of this invention comprises means forming a housing, means for securing a plural component nozzle to the apparatus, means defined by an elastomeric seal adapted to mate the nozzle, means for collecting separately each plural component from the nozzle, means for directing separately the plural components to the collecting means, and means for measuring the amount of each plural component collected.

The operation of this invention is initiated by inserting the plural component nozzle into the molded elastomeric seal located, preferably, atop the housing of the tester and actuating the nozzle for a predetermined length of time. Generally, a duration of ten to fifteen seconds is sufficient. The plural components are then dispersed by the device into the elastomeric seal. The seal receives the plural components, for example, the catalyst and the resin, through separate channels which are connected to individual hoses which then carry each plural component separately to separate collecting means, such as graduated containers located within the housing of the tester. The container's contents are then observed and the ratio of catalyst to resin is easily determined by the ratio of the volumes of liquid collected. The containers can then be removed from within the housing of the tester and emptied for reuse.

The rate of flow and relative percentage of each component are determined by considering the relative volumes of each component dispersed. The measurement and ratio determination are independent of the time interval involved because the resin and catalyst samples are taken simultaneously for the same times. The graduated containers can vary in size to accommodate various component systems and the different catalyst-to-resin ratios that are used in different plural component systems.

DETAILED DESCRIPTION OF THE PREFERRED EMBODIMENTS

Figure 1:
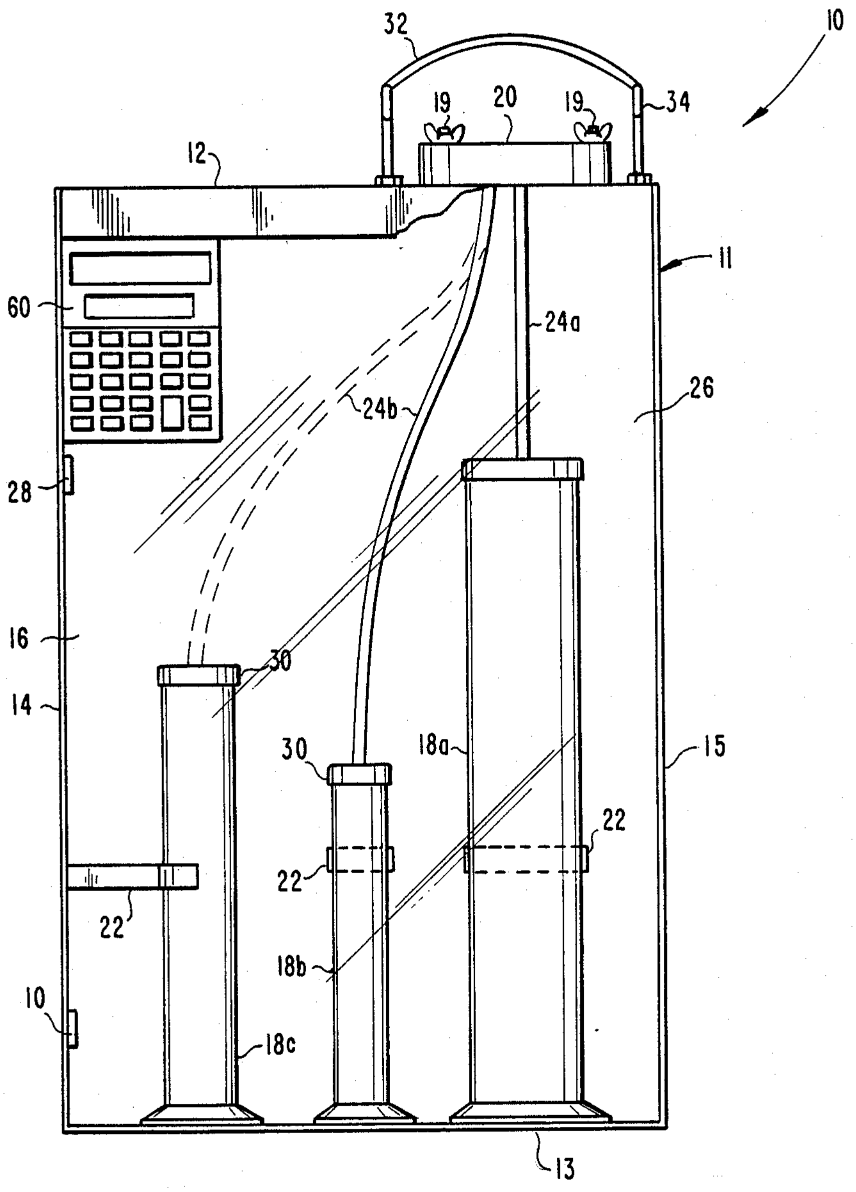
FIG. 1 is an anterioral schematic view of a cross-section of a plural component tester incorporating this invention.
Figure 2:
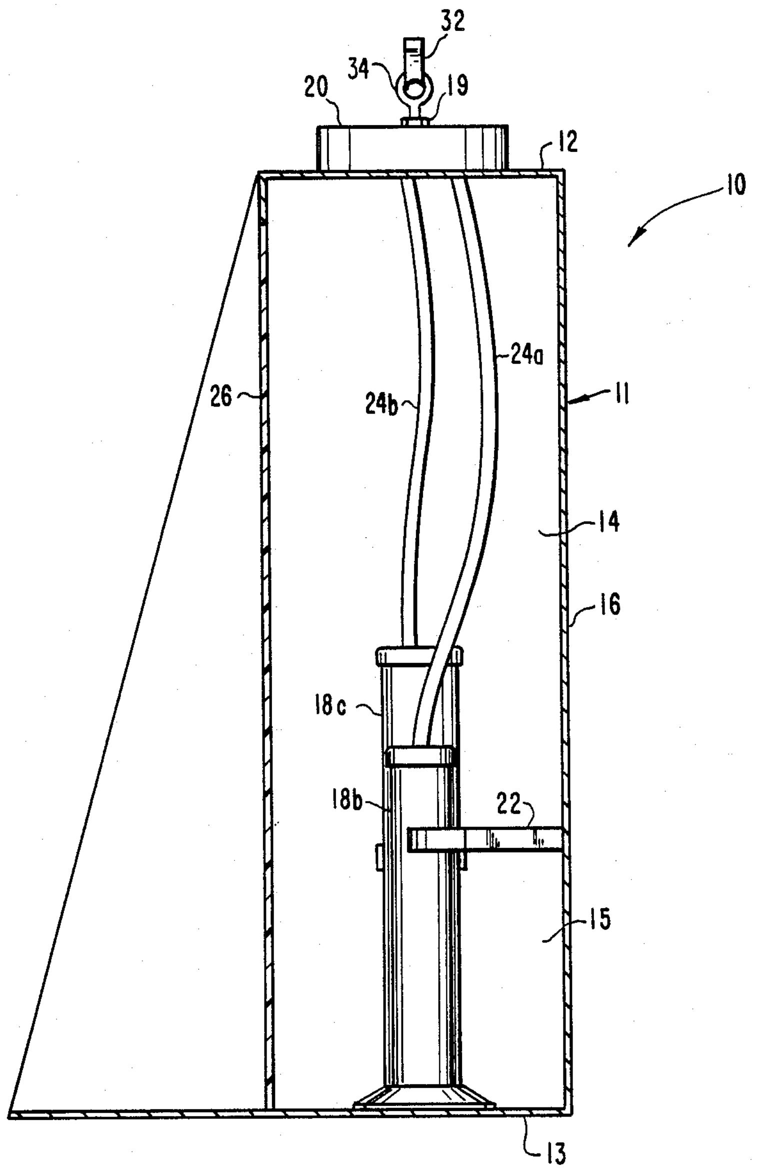
FIG. 2 is a lateral schematic view of a crosssection of a plural component tester incorporating this invention as illustrated in FIG. 1.

Turning now to FIG. 1, a plural component tester 10 incorporating this invention includes generally a means forming a housing 11 with the housing forming a top 12, a bottom 13, and three sides 14, 15 and 16; a means for securing a spray nozzle device to the housing, shown in FIG. 1 as defined by a band 32 adapted to be tightened down about the spray device by fasteners 19; a means adapted to mate the spray nozzle defined by a molded elastomeric seal 20 through which the plural components are introduced; a means for separately collecting each component within housing defined by two or more graduated containers 18*a*, 18*b* and 18*c* detachably secured to the housing by clamp-like devices 22; a means of advancing separately the components from the means adapted to mate the spray nozzle 20 defined by a plurality of hoses 24*a* and 24*b*, delivering each component to the graduated containers.

The housing is closed on its fourth side to confine the liquid and testing operation. A closure means 26 also serves as means permitting the removal of the graduated containers 18*a*–18*c*. Closure means 26 preferably includes a transparent cover 26 for the fourth side of the housing attached to the housing by hinged devices 28. The transparent cover is adapted to be opened for purposes of detaching the graduated containers from the securing devices and removing them from within the housing.

The means for measuring the amounts of each component separately collected is preferably defined by graduated collecting containers 18*a*, 18*b* and 18*c* which disclose the respective amounts of each component collected by their graduated markings. The graduated containers are adapted to prevent the escape of components once the components are delivered to the containers by means defined by cap-like devices 30 secured at the top of the containers and adapted to receive a hose but not to allow the escape of components once delivered. As shown in FIG. 1, the graduated containers 18*a*, 18*b* and 18*c* may differ in size to accommodate varying amounts of different components collected during testing. The large containers 18*a* is connected through connecting hose 24*a* with the resin orifice of the plural component nozzle. The smaller containers 18*b* and 18*c* are connected with the catalyst orifice of the plural component nozzle through connecting hose 24*b*. If the ratio of resin to catalyst is very large, container 18*b*, the smaller of the two small containers, is used by inserting connecting hose 24*b* into container 18*b* rather than 18*c*, as shown in FIG. 1. The use of container 18*c* is indicated in phantom lines in FIG. 1.

Figure 3:
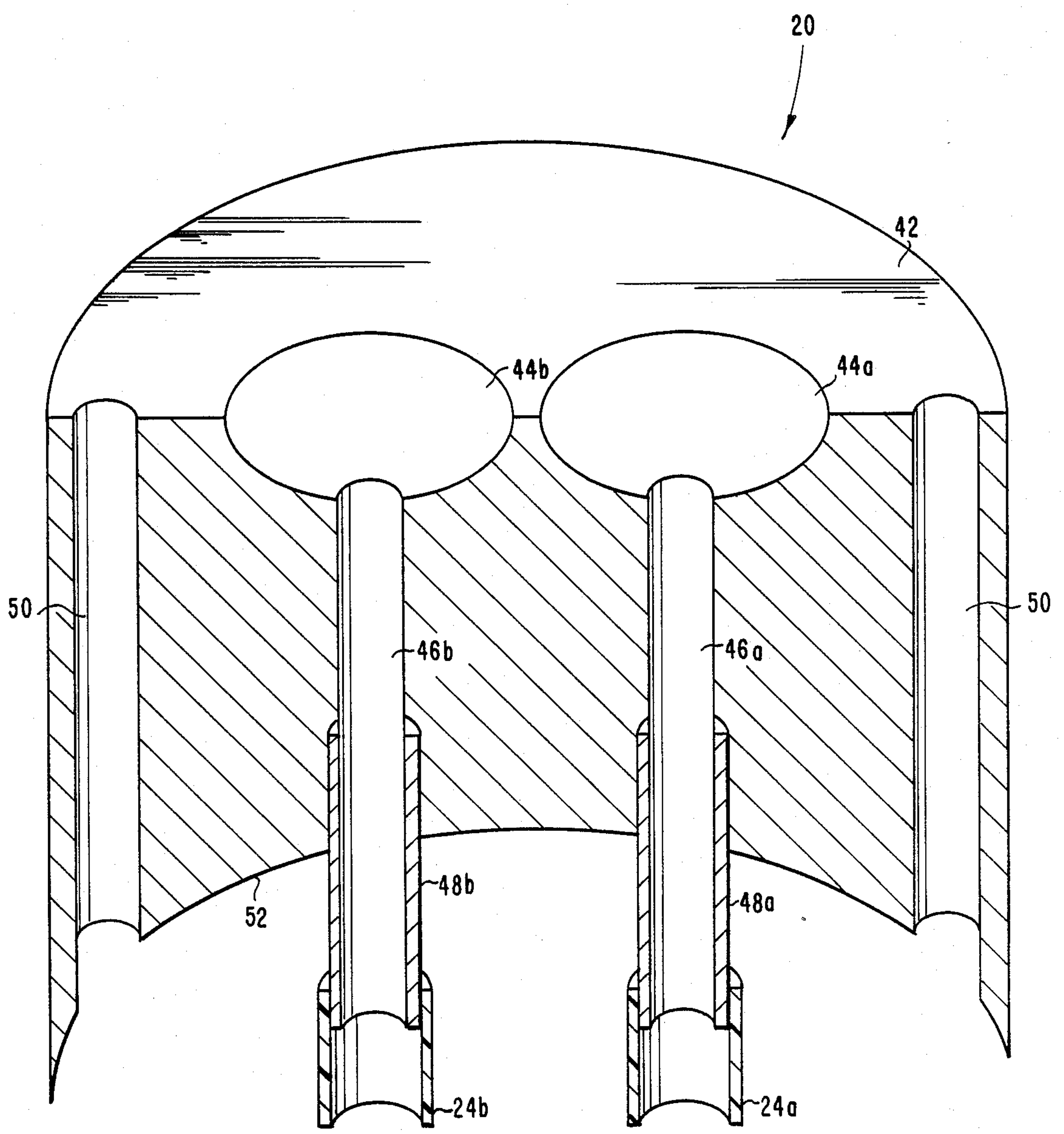
FIG. 3 is a partial cross-sectional perspective of the molded elastomeric seal incorporated in this invention.

A means adapted to mate the plural component nozzle for introducing the plural components separately is incorporated into the molded elastomeric seal 20, as shown in FIG. 3, which has two or more channels 46 running downwardly within the seal. The upper surface 42 of the seal has two or more concave-beveled areas 44*a* and 44*b* which mate the two or more apertures of the plural component nozzle to conduct each component into one of channels 46*a* and 46*b* while dispensing. Connecting tubes 48*a* and 48*b* are inserted into the two or more channels 46*a* and 46*b* extending below the under surface 52 of the seal. Each of the two or more separating channels 46*a* and 46*b* is connected via connecting tubes 48*a* and 48*b* to individual hoses 24*a* and 24*b* which conduct and deliver the component to the graduated containers 18*a* and 18*b* or 18*c*. The seal is further adapted to be affixed to the top 12 of the housing 11 upon fasteners 19 which are inserted through channels 50 running downwardly through the seal and adjacent to the periphery of the seal.

During the use of the tester of this invention, the plural component nozzle for the plural component system is placed on the elastomeric seal 20 shown in FIG. 3 in such a manner that the resin nozzle fits into one of the concave sealing portions 44*a*; and the catalyst nozzle fits into the other of the cavity portions 44*b*. In practice, the elastomeric seal 20 is molded to conform to the face of the plural component nozzle of each plural component device being used. Thus, the elastomeric seal 20 is formed with a plurality of cavities 44 spaced apart and arranged to mate the face of a specific plural component device being used.

When, during the operation of the plural component device, the operator wishes to ensure that the proper ratio of resin to catalyst is being used, he can place the plural component device he is using, for example, a plural component spray gun, against the elastomeric seal 20 in such a position that the resin and catalyst orifices are aligned respectively with the portions 44*a* and 44*b* of the elastomeric seal and operate the device for a time long enough to collect a measurable sample of the plural component materials. During the operation, resin is collected in the larger graduated container 18*a*; and catalyst is collected in one of the smaller graduated containers 18*b* or 18*c*. After stopping the operation, the operator need only read the volume of resin collected in graduating container 18*a* and the volume of catalyst collected in either of containers 18*b* or 18*c*. Since the ratio of resin to catalyst is independent of time, the ratio of resin to catalyst can be determined by dividing the measured volume of resin by the measured volume of catalyst. For convenience, a calculator 60 may be attached to the tester as shown in FIG. 1. As noted above, the selection of which of the smaller containers 18*b* or 18*c* is to be used depends upon the resin-to-catalyst ratio. For convenience, when the expected volume of catalyst to be collected during testing is small, it is more convenient and generally more accurate to collect the catalyst within the smallest of the containers 18*b*.

When testing is completed, the operator can open the transparent door 26, remove the graduated containers 18*a* and either 18*b* or 18*c*, whichever contains catalyst, from housing 11, discard the collected materials and replace the containers in the housing 11, thereby preparing the tester 10 for use at a later time.

If the operator does not wish to hold the plural component device against elastomeric seal 20, the means for securing the spray nozzle onto the housing, shown as strap 32 and fastener 34, may be used to hold the spray gun to the tester as it is being actuated.

In practice, such a tester may be easily and inexpensively manufactured. The housing may be constructed of painted steel or aluminum or other structurally sound metal material. A typical housing has a size generally fourteen inches high by eleven inches wide by four inches deep. The top 12, bottom 13 and three sides 14, 15 and 16 may be formed from metal. The transparent cover, or door 26 may be formed from Lexan TM, a General Electric polycarbonate material or Lucite TM, a DuPont polyacrylate material or another such transparent thermoplastic material, permitting the operator to view the test without being exposed to the liquid material during testing. The graduated cylinders 18*a*–18*c* may be glass, nylon polypropylene or other translucent material and may be cylinders graduated in ounces or millimeters and manufactured for use in a chemical laboratory. The connecting hoses 24*a* and 24*b* may be nylon and the elastomeric seal 20 may be manufactured from silicon rubber, permitting it to be molded to mate with the nozzle of any of a plurality of plural component devices. The other fasteners, clips, hinges, and components of the tester may be of any kind commonly suited for this application.

Other features and embodiments of this invention will be apparent to those skilled in the art, and this invention is to be limited only by the scope of the claims that follow:

We claim:

1. An apparatus for collecting separately plural components dispersed separately from a spray nozzle, comprising:

means forming a housing;

means for securing said spray nozzle onto said housing;

means adapted to receive said spray nozzle for introducing separately said plural components into said housing;

means for separately collecting each said component within said housing;

means for advancing separately said components from said means adapted to mate said spray nozzle to said collecting means;

means permitting the removal of said collecting means from within said housing;

means for measuring the amounts of said components collected within said collecting means; and means for securing said collecting means within said housing.

2. An apparatus as in claim 1 wherein said apparatus includes means securing a spray nozzle of said spray device onto said housing comprising a band secured to said housing at opposite sides of said means adapted to receive the spray device, said band being adapted to tighten down about said spray nozzle.

3. An apparatus as in claim 1 wherein said means for introducing said plural components into said housing includes a molded elastomeric seal on the top surface of said housing to receive said spray nozzle, said seal being adapted to direct the dispersion of each said component into separate channels running longitudinally through said seal.

4. An apparatus as in claim 3 wherein said means for advancing said plural components includes a plurality of hoses connected to the separate channels of said molded elastomeric seal through which said components are advanced.

5. An apparatus as in claim 4 wherein said means for collecting separately said plural components includes container-like articles into which said plurality of hoses delivers said components, said containerlike articles having an opening adapted to receive said hoses and to prevent the escape of said component once said component is delivered to said collecting article.

6. An apparatus as in claim 5 wherein said container-like articles include graduated metering containers positioned within said housing.

7. An apparatus as in claim 1 wherein said means for separately collecting said plural components includes collecting containers of varied size.

8. An apparatus as in claim 1 wherein said means permitting removal of said collecting means from within said housing includes a transparent cover secured by hinged devices to said housing; said cover being adapted to be opened or removed.

9. An apparatus for measuring the respective ratio of resin and catalyst dispersed by a plural component spraying system having separate apertures for each said component, comprising:

a housing forming a top, a bottom, and three sides;

an elastomeric coupling at the top of said housing including at least two openings and adapted to provide sealing engagement with each of its at least two openings in communication with one of said separate apertures of said plural component spraying system;

at least two conduits within said housing leading from said openings of said elastomeric coupling; and at least two graduated containers within said housing, one of said at least two conduits leading from one of said openings in said elastomeric coupling to one of said graduated containers and the other of said at least two conduits leading from the other of said openings in said elastomeric coupling to the other of said graduated containers.

10. An apparatus as in claim 9 wherein said housing includes a cover defining and closing a fourth side of said housing, said cover permitting the removal of said at least two graduated cylinders from within said housing, said cover being attached to said housing and adapted to be opened or removed.

11. The apparatus as in claim 10 wherein one of said graduated containers is larger than at least one of the other said graduated containers.

12. An apparatus for collecting separately plural components dispersed separately from a spray nozzle, comprising:

means forming a base;

means adapted to mate with said spray nozzle for receiving separately said plural components;

means for securing said spray nozzle onto said base;

means for separately collecting each said component, said collecting means being releasably secured to said base;

means for advancing separately said components from said means adapted to mate with said spray nozzle to said collecting means;

means for detachably securing said collecting means to said base; and means for measuring the amounts of said components collected within said collecting means.

13. An apparatus as in claim 12 wherein said means securing said spray nozzle onto said base includes a band secured to said base opposite said mating means and adapted to tighten down about said spray nozzle when said spray nozzle is engaged with said mating means.

14. An apparatus as in claim 12 wherein said means for receiving said plural components includes a molded elastomeric seal supported above the surface of said base to receive said spray nozzle, said seal being adapted to direct the dispersion of each said component into separate channels running longitudinally through said seal.

15. An apparatus as in claim 14 wherein said means for advancing said plural components includes a plurality of hoses connected to the separate channels of said molded elastomeric seal through which said components are advanced.

16. An apparatus as in claim 15 wherein said means for collecting separately said plural components includes a plurality of container-like articles into which said plurality of hoses delivers said components, each of said plurality of container-like articles having an opening adapted to receive said hoses and to collect said component once said component is delivered to said plurality of container-like articles.

17. An apparatus as in claim 16 wherein said plurality of container-like articles comprises graduated metering containers.

18. An apparatus as in claim 17 wherein said plurality of container-like articles comprises graduated metering containers having different sizes.

* * * * *